United States Patent [19]

Motoyoshi et al.

[11] Patent Number: 4,827,463
[45] Date of Patent: May 2, 1989

[54] DISC MEMORY DEVICE

[75] Inventors: Takeo Motoyoshi; Naoyuki Nakatsukasa; Katsufusa Tanaka; Tooru Yamashita, all of Hyogo, Japan

[73] Assignee: Mitsubishi Denki Kabushiki Kaisha, Tokyo, Japan

[21] Appl. No.: 164,309

[22] Filed: Mar. 4, 1988

[30] Foreign Application Priority Data

Apr. 7, 1987 [JP] Japan ................................. 62-86112
Apr. 28, 1987 [JP] Japan ................................ 62-105865
May 7, 1987 [JP] Japan ................................ 62-112823

[51] Int. Cl.[4] ........................ G11B 5/48; G11B 17/00
[52] U.S. Cl. ..................................................... 369/36
[58] Field of Search ............................. 369/34, 36, 38

[56] References Cited

U.S. PATENT DOCUMENTS

4,608,679  8/1986  Rudy et al. ........................... 369/34

Primary Examiner—Steven L. Stephan
Attorney, Agent, or Firm—Sughrue, Mion, Zinn, Macpeak & Seas

[57] ABSTRACT

An inserting and retrieving mechanism of a "Juke Box" type disc memory device includes a movable body which has pushing members adapted to push a cartridge into a stocker or a recording and reproducing device of the disc memory device and a pair of clampers adapted to pull out the cartridge from the stocker or recording and reproducing device in association with engaging recesses formed on the cartridge, a driving means for opening and closing the clampers through a toggle means arranged symmetrically about the driving means, a first position sensor provided on the inserting and retrieving mechanism for detecting a position of a rear end of the cartridge when it reaches a position in which the clampers are ready to clamp the cartridge and a second position sensor provided in the stocker and/or the recording and reproducing device for detecting a position of a front end of the cartridge when it reaches a position in which the cartridge is ready to be released. The inserting and retrieving mechanism may have a pair of cartridge holding portions so that a pair of cartridges are to be handled, simultaneously.

9 Claims, 21 Drawing Sheets

DISC MEMORY DEVICE

BACKGROUND OF THE INVENTION

The present invention relates to a disc memory device of the so-called "Juke Box" type for selectively deriving a cartridge stored in a stocker by an inserting and retrieving means and inserting the derived cartridge into selected one of recording and reproducing devices, or vice versa.

Figure 17:
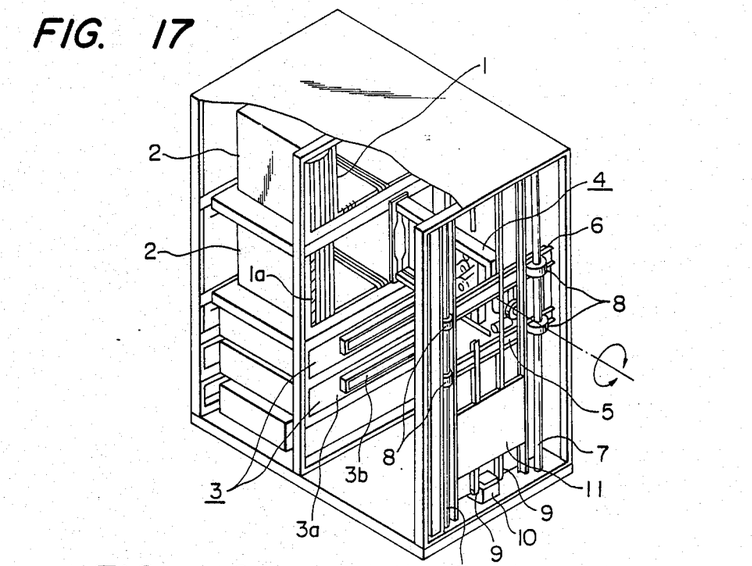
FIG. 17 is a perspective view of an example of a conventional disc memory device.
Figure 18:
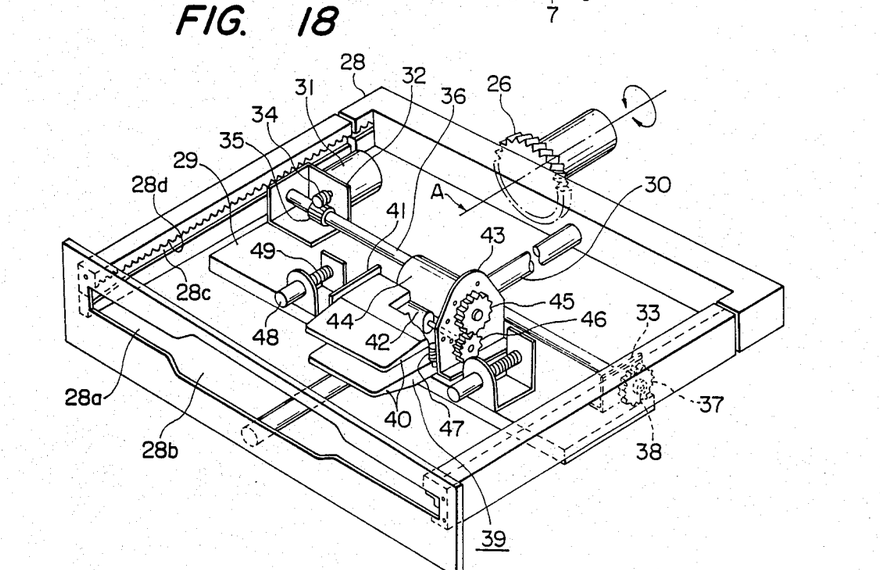
FIG. 18 is a perspective view of an inserting and retrieving mechanism of the conventional device shown in FIG. 17.
Figure 19:
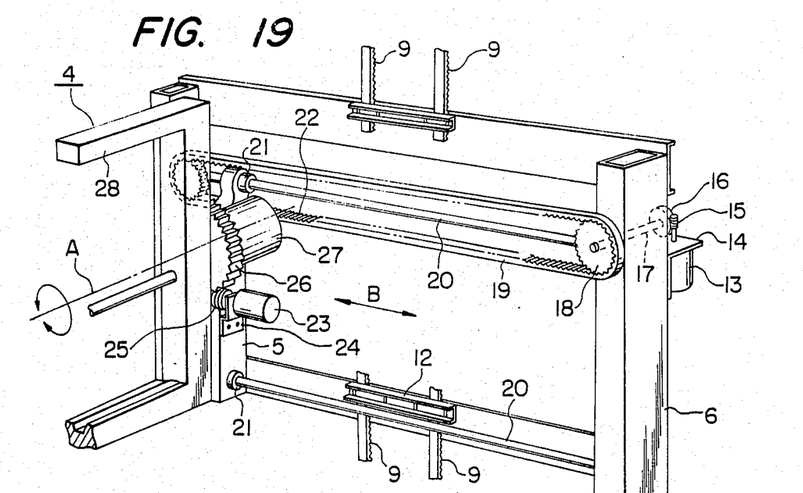
FIG. 19 is a perspective view of a carriage of the device in FIG. 17.

FIG. 17 is a schematic perspective view of a conventional disc memory device such as shown in Japanese Utility Model Application Laid-Open No. 170157/1986, FIG. 18 is a perspective view of a main portion of an inserting and retrieving mechanism thereof and FIG. 19 is a perspective view of a carriage for moving the inserting and retrieving mechanism.

In FIG. 17, a reference numeral 1 depicts cartridges each of which houses a disc which is an information recording medium, the respective cartridges 1 being put aligned laterally on shelves of a stocker 2. Recording and reproducing devices 3 are adapted to read and write informations on the discs in the cartridges 1. An inserting and retrieving mechanism 4 includes a base member 5 and a mechanism for inserting and/or retrieving the cartridge 1 with respect to the stocker 2 and the recording and reproducing device 3. The latter mechanism is mounted rotatably by a rotary mechanism provided on a vertically movable carriage 6. A pair of parallel vertical rails 7 each being a rod having a circular cross section support sliding members 8 fixedly mounted on the carriage 6 to guide the carriage 6 vertically. Toothed belts 9 are associated with the carriage 6 and a balancer 11 to transmit drive power of an elevator motor 10 thereto.

In FIG. 19, the carriage 6 is engaged with the belts 9 through metal connecting wares 12. A motor 13 for moving the base member 5 in directions shown by an arrow B is mounted on the carriage 6 by a mounting metal ware 14. A reference numeral 15 depicts a worm mounted on a shaft of the motor 13, 16 a worm wheel meshed with the worm 15, 17 a shaft for transmitting rotational force from the worm wheel 16 to a pulley 18 and 19 a toothed endless belt which meshes with the pulley 18 and a roller and has a portion fixed to the base member 5 by a belt mounting metal ware 22. A pair of parallel, lateral rails 20 each in the form of a rod are supported by the carriage 6 and engaged slidably with a slider 21 mounted on the base member 5. A reference numeral 23 depicts a motor for rotationally driving the inserting and retrieving mechanism 4 mounted on the base member 5 by a mounting metal ware 24 and a worm 25 engaged suitably with an end of a shaft of the motor 23 meshes with a worm wheel 26 rotatably supported by a bearing means 27 provided on the base member 5.

The worm wheel 26 is fixed to a frame 28 of the inserting and retrieving mechanism 4 so that it rotates together with the frame 28 around a rotation center A when the motor 23 is actuated.

In FIG. 18, a reference numeral 29 depicts a movable body having a slider (not shown) on a lower surface thereof and a mechanism for moving the movable body and a gripping mechanism 39 for the cartridge on an upper surface thereof. The slider is slidably engaged with a guide shaft 30 supported by the frame 28. A motor 31 is mounted on a bearing member 32 fixedly provided on the movable body 29 to move the movable body 29 along the rotation axis A. A reference numeral 33 is a bearing member mounted on the movable body 29, 34 a worm mounted on a shaft of the motor 31 and 35 a worm wheel mounted on one end portion of a synchroshaft 36 and meshed with the worm 34. Rollers 38 and pinions 37 are mounted on opposite ends of the synchroshaft 36, respectively. The rollers 38 are adapted to rotate in guide grooves 28c provided in both sides of the frame 28 for a smooth movement of the movable body 29 and the pinions 37 mesh with racks 28d provided in one sides of the guide grooves 28c. Therefore, the moving body 29 is possible to move with a fixed attitude by the rollers 38 which rotate while engaging with the guide grooves 28c and the guide shaft rod 30. A reference numeral 40 depicts a pair of vertically operable clampers for clamping the cartridge 1, 41 a support member, 43 a bearing member for mounting a motor 44, the clampers 40 and a cam shaft 42 being rotatably supported by the support member 41 and the bearing member 43, 45 and 46 gears for transmitting rotation of the motor 44 to the cam shaft 42 and 47 a compression spring for biasing the clampers 40 to close the latter. With the cam shaft 42 in the shown position, the clampers 40 are opened. When the cam shaft 42 rotates by 90 degree from the shown position, the clampers 40 is closed by an action of the spring 47 to hold the cartridge 1.

The clampers 40 can move through an opening 28b. A reference numeral 48 depicts stoppers which are resiliently supported by springs 49 to absorb mechanical shocks to be given to a front end of the cartridge when the clampers 40 engage therewith.

This apparatus serves to selectively derive any one of cartridges 1 stored in a stocker 1 and insert it into one of the recording and reproducing devices, or retrieve the cartridge from the recording and reproducing device and return it to its original position in the stocker.

Describing an operation thereof when one (1a) of the cartridges 1 shown in FIG. 17 is to be derived from the stocker 2 and supplied to one (3a) of the recording and reproducing devices 3, as an example, an instruction ordering a deriving the cartridge and an insertion thereof into the recording and reproducing device is supplied, upon which the motors 10, 13 and 23 are energized by a controller (not shown) so that an inlet opening 28a formed in a front face of the frame 28 of the inserting and retrieving mechanism 4 is aligned with the cartridge 1a in the stocker 2. When an alignment is achieved, the motor 44 is energized to rotate the cam shaft 42 to thereby open the clampers 40 against the spring 47. Then, the motor 31 is energized to advance the movable body 29 to a position in which the clampers 40 is enabled to clamp the cartridge 1a in the stocker 2 through the opening 28a. At this time, the position of the movable body 29 is sensed by a sensor (not shown) provided in a front portion of the frame 28. Then, the motor 44 is energized again to rotate the cam shaft 42 by 90 degree to close the clampers 40 to thereby grip a front edge portion of the cartridge 1a. Thereafter, the motor 31 is driven in a reverse direction to retrieve the movable body 29 together with the cartridge 1a along the guide grooves 28c of the frame 28. After the cartridge 1a is introduced into the grooves 28c, the frame 28 is rotated by 90 degree by the motor 23 in a direction ordered by an instruction for selecting either surface of the cartridge 1 and, simultaneously, the inserting and retrieving mechanism is moved by the motors 13 and 10 to a position in which an inlet opening 3b of the recording and reproducing device 3a is aligned with the cartridge inlet opening 28a of the frame 28. Then, the motor 31 is drived forwardly so that the clampers 40 are advanced until the stopping position thereof is sensed by the sensor (not shown) mounted on the frame 28 and the cartridge is inserted into the recording and reproducing device 3. When the insertion is completed, an insertion end signal is supplied to the recording and reproducing device 3, upon which the motor 44 is actuated to open the clampers 40 and, then, the motor 31 is actuated in the reverse direction to retrieve the movable body 29.

The cartridge 1a inserted is further pulled in to a position in the recording and reproducing device 3 by a pulling means (not shown) thereof. Upon a completion of recording or reproducing, the cartridge 1a is returned to the original position in the stocker 2 through an operation which is just reverse to that mentioned above.

Figure 20:
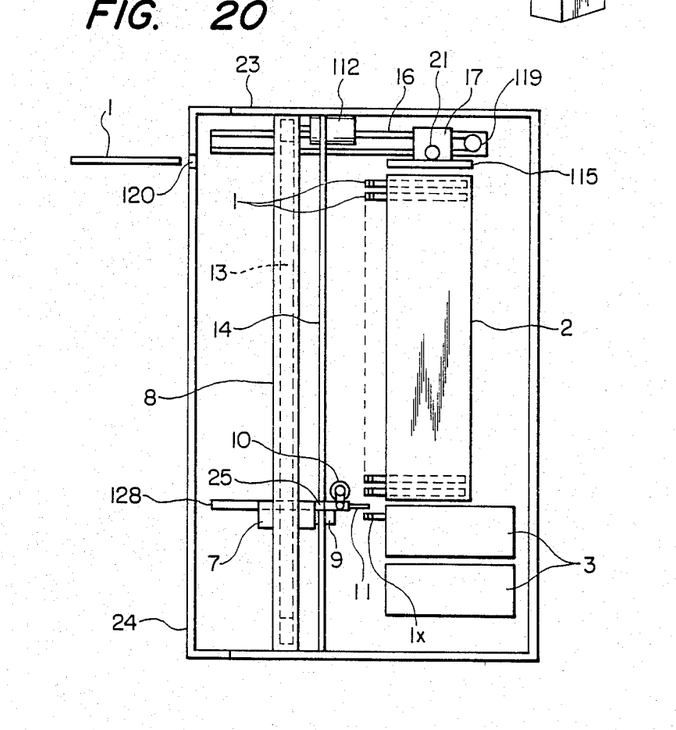
FIG. 20 is a side view of another example of a conventional disc memory device.
Figure 21:
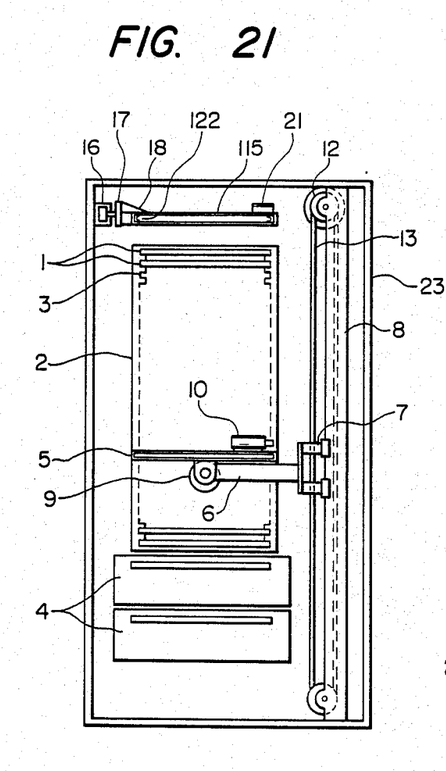
FIG. 21 :s a front view of the device in FIG. 20.
Figure 22:
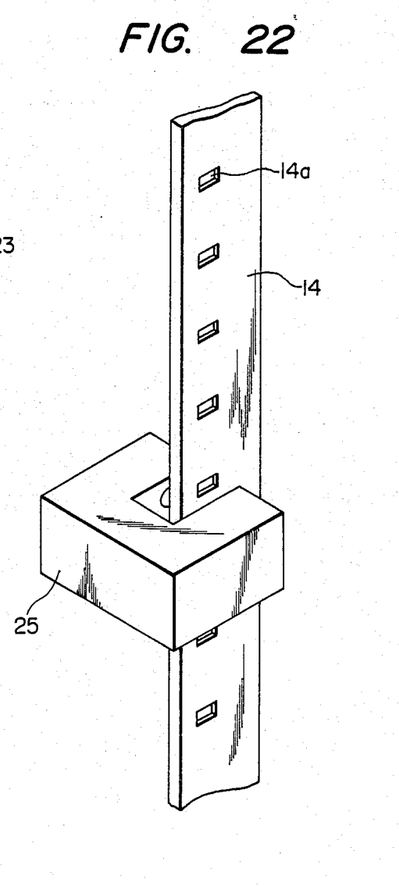
FIG. 22 shows a scale and a scale sensor for detecting a relative position thereof.

FIGS. 20 and 21 are a side view and a front view of another conventional disc memory device such as disclosed in Japanese Utility Model Laid-Open No. 136367/1986, respectively, and FIG. 22 is an example of a scale sensor which provides a signal indicative of a vertical position of an inserting and retrieving mechanism.

In this conventional device, a cartridge 1 is inserted into the disc memory device by moving a slide table 115 to a front panel 24 of the disc memory device by means of a horizontal motor 119, and then inserting the cartridge into a cartridge inlet/outlet port 120 manually. When the cartridge 1 is received by a cartridge inlet/outlet mechanism 122, the latter pulls the cartridge 1 in the slide table 115 which is moved rearwardly by the motor 119. Then, a frame 128 is elevated by a vertical motor 112 to a position corresponding to the slide table 115 by means of a scale 14 and a scale sensor 25. Thereafter, clampers 111 pull the cartridge 1 in the frame 128 by a motor 110 mounted thereon.

After this operation, the frame 128 is moved to a shelf of the stocker or to an inlet of the recording and reproducing device 3 and stopped at an exact position by the scale 14 and the scale sensor 25. Then, the clampers 111 are moved to the shelf or the recording and reproducing device to insert the cartridge 1 held thereby into the device 3 or the shelf.

When the cartridge 1 in the shelf or the recording and reproducing device is to be discharged from the disc memory device, the operation is reversed.

A transportation of the cartridge 1 between the stocker and the recording and reproducing device 3 is performed by positioning the frame 128 at an exact position of the shelf or the inlet/outlet port of the recording and reproducing device, moving the clampers 111 to the cartridge 1 existing in that position to hold it, retrieving it and moving the carriage to a suitable position.

Since, in the conventional disc memory device, the cartridge inserting and retrieving mechanism is constituted in such the way as that the vertically arranged cartridge is held in both sides thereof by the clampers, a relatively large power is necessary to hold the cartridge, that is, a large motor is necessary. Further, in order to correct a positional deviation of the cartridge from a position in which a cartridge grasping operation of the clampers is performed correctly, it is necessary to regulate the stoppers at the time of the operation of the clampers. This requires a complicated structure of the gripping mechanism which is usually large in size, making a rapid motion thereof impossible.

In connection to this problem, there is another problem that, when the gripping mechanism which is being moved while holding the cartridge is stopped, the clampers tend to open due to inertia of the cartridge causing the latter to be dropped or deviated from a desired gripping position. Therefore, it is necessary to strictly hold the cartridge by another means which makes the whole device large in size.

Further, since, in the conventional device, the stop position of the frame is detected by a single sensor provided in a front edge of the frame for both cases of deriving the cartridge from the stocker and retrieving it from the recording and reproducing device, it is necessary to make a positional relation of the inserting and retrieving mechanism in the moving direction thereof to the stocker or the recording and reproducing device precise, otherwise, the cartridge may be inserted unreasonably when the inserting and retrieving is stopped closer to the stocker or the recording and reproducing device or can not be clamped when it s stopped far from the stocker or the recording and reproducing device. This requires complicated machining of various constitutional components of the whole mechanism. Further, it is necessary to increase the rigidity of the support members of the transportation mechanism and the stocker.

Further, when it is desired to replace a cartridge in a certain position in the disc memory device, for example, in the recording and reproducing device, with another cartridge, it is necessary to remove the former cartridge and thereafter to insert the new cartridge. Therefore, the number of steps required to complete such replacement of the cartridge in one position is considerably large and the replacement takes a considerably long time.

SUMMARY OF THE INVENTION

An object of the present invention is to provide a disc memory device having a cartridge inserting and retrieving mechanism whose cartridge clamp mechanism is simple in construction, ensuring an exact insertion and retrieval of a cartridge with respect to a cartridge stocker and a recording and reproducing device.

Another object of the present invention is to provide a disc memory device having a cartridge inserting and retrieving mechanism including a cartridge clamp mechanism whose clampers holding the cartridge do not open by inertia of the cartridge even if external force is applied thereto.

Another object of the present invention is to provide a disc memory device which is capable of determining a forward stop position of a cartridge inserting and retrieving mechanism as precise as necessary to insert or retrieve a cartridge properly even when it is impossible to obtain an exact relative position between the inserting and retrieving mechanism and the stocker or the recording and reproducing device.

Another object of the present invention is to provide a disc memory device which has a carrier mechanism which is simple in construction and by which a pair of cartridges can be transported to reduce the number of steps necessary to replace a cartridge by another.

According to an aspect of the present invention, a movable body of an inserting and retrieving mechanism of the disc memory device is provided with a pushing member which is made in contact with a front surface of the cartridge and pushes the latter into the stocker or the recording and reproducing device when the cartridge is to be inserted thereinto and is provided with a pair of clampers having engaging portions which engage with engaging recesses formed in both side surfaces of the cartridge and pull the latter thereby when the cartridge is to be retrieved.

According to another aspect of the present invention, a swing lever is provided on a center portion of the movable body and the clampers are arranged symmetrically about a rotation center thereof. The clampers are linked through a toggle link mechanism arranged symmetrically around the swing lever and held reliably in an open or close state by a rotation of the swing lever.

According to a further aspect of the present invention is featured by that, when a cartridge is derived by the cartridge inserting and retrieving mechanism from the stocker or the recording and retrieving device, a first position sensor provided on the inserting and retrieving mechanism detects a rear face of the cartridge to stop a forward movement of the inserting and retrieving mechanism and to allow the clamp mechanism of the inserting and retrieving mechanism to clamp the cartridge and, when the cartridge is to be inserted into the stocker or the recording and reproducing device, a second position sensor provided on the stocker or the recording and reproducing device detects a front face of the cartridge to stop the forward movement of the inserting and retrieving mechanism to allow the clampers to be opened. Therefore, it is possible to stop the inserting and retrieving device at a position corresponding to a cartridge feeding and discharging position of the stocker or the recording and reproducing device, facilitating an exact insertion and retrieval of the cartridge.

In another aspect, he inserting and retrieving mechanism is designed to have a pair of units each for holding a cartridge so that a cartridge held in one unit can be returned to the stocker or inserted into the recording and reproducing device after another cartridge is retrieved and held in the other unit.

DETAILED DESCRIPTION OF THE PREFERRED EMBODIMENTS

Figure 1:
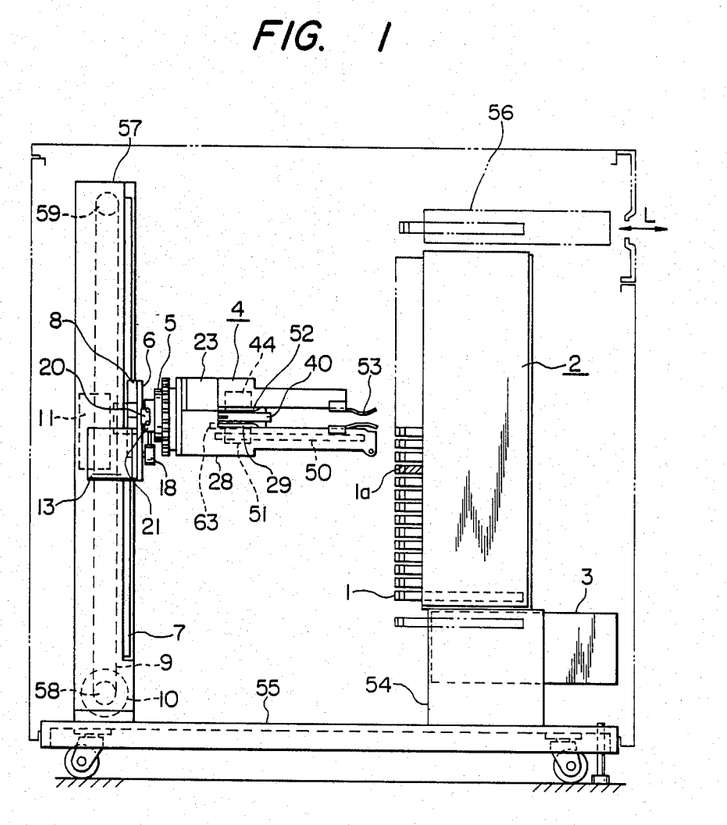
FIG. 1 is a side view of a disc memory device according to an embodiment of the present invention.

In FIG. 1 which shows an embodiment of the present invention, cartridges 1 in each of which a disc is housed as a recording medium of information are stored on shelves (not shown) provided in a stocker 2 in aligned stack as shown. Below the stocker 2, recording and reproducing devices 3 for reading and writing information on the disc in the cartridge 1 are disposed as supported by a support structure 54 which is mounted on a base 55.

A cartridge feeding and discharging device 56 is mounted on the stocker 2 for taking in and out cartridges from a storage means externally of the present device. Since, however, such device as 56 does not constitute the present invention, description thereof is omitted in this description. A cartridge inserting and retrieving mechanism 4 is constituted with a rotatable C shaped frame 28 as a main structural component, which will be described in detail later. In brief, the frame 28 is constituted with a support member 28c and a pair of C shaped frame members 28a and 28b having closed ends fixed to the support member 28c which is is mounted rotatably on a base member .5. The base member 5 is rotatably supported in cantilever fashion by a carriage 6 through a slider 21 and a rail 20. The carriage 6 is vertically movably supported by a pair of slider assemblies each composed of a slider 8 and a rail 7 mounted on a column 57. A motor 10 for vertically driving the carriage 6 is mounted on a lower portion of the column 57 and the carriage 6 is connected to a belt 9 extending over a pulley 58 provided on an end of a shaft of the motor 10 and a pulley 59 mounted rotatably on an upper portion of the column 57. A balancer 11 is mounted on the belt 9 to reduce an output power of the motor 10 necessary to drive the belt 9. As shown, the inserting and retrieving mechanism and the transportation mechanism are mounted on the column 57.

A means for moving a clamp portion, a reversing means and a lateral transportation means of the inserting and retrieving mechanism 4 will be described with reference to FIGS. 2, 3 and 4.

In these figures, the recording and reproducing devices 3 are arranged side by side and the stockers 2 are arranged thereon side by side so that a recording and reproducing of more information can be performed rapidly.

The inserting and retrieving mechanism 4 is movable laterally. A motor 13 is provided for this purpose, which is directly mounted on a rear surface of the carriage 6. The base member 5 is connected to an endless belt 19 extending over a pulley 18 mounted on an end of a shaft of the motor 13 and a pulley 63 rotatably mounted on the other end of the carriage 6, so that the base member 5 is moved laterally with rotation of the motor shaft. A main shaft (to be described later) for reversing the inserting and retrieving mechanism 4 and a gear 26 are fixedly mounted on a center portion of a front surface of the base member 5. The main shaft supports the member 28c of the frame 28 reversibly through a cross-roller bearing (to be described later). A motor 23 is mounted on the member 28c for reversible movement thereof. A pinion 25 is fixedly mounted on an end of a shaft of the motor 23 and meshes with the gear 26. That is, the motor 23 rotates the gear 25 which orbits around the gear 26 while rotating. This construction is employed to balance a reverse movement and to facilitate a bundling of wirings of the motor 23 and the inserting and retrieving mechanism. On the other hand, a sensor (to be described later) is provided on the reverse side to confirm a reversed condition.

The clamp mechanism is provided on the movable body 29 and a motor 31 is directly mounted on the closed side of the member 28a of the frame 28. A support table 63 provided on a lower surface of the movable body 29 is connected to a belt 62 running over a pulley 60 mounted on an end of a shaft of the motor 31 and a pulley mounted rotatably on an open side of the member 28a to move the movable body 29 with respect to the stocker 2. Further, a slider 51 is mounted on a lower surface of the support table 63 as shown in FIG. 1, which moves along rails 50 provided on an inner surfaces of the members 28a and 28b of the frame 28. A reference numeral 64 depicts a sensor mounted on the movable body 29 to detect a rear face of the cartridge 1. A sensor 65 is provided on a rear side of each stocker 2 to detect a front face of the cartridge 1. Springs 87 is provided on each side of the respective shelf of the stocker 2 to hold the cartridge 1 stably in the stocker 2.

Figure 2:
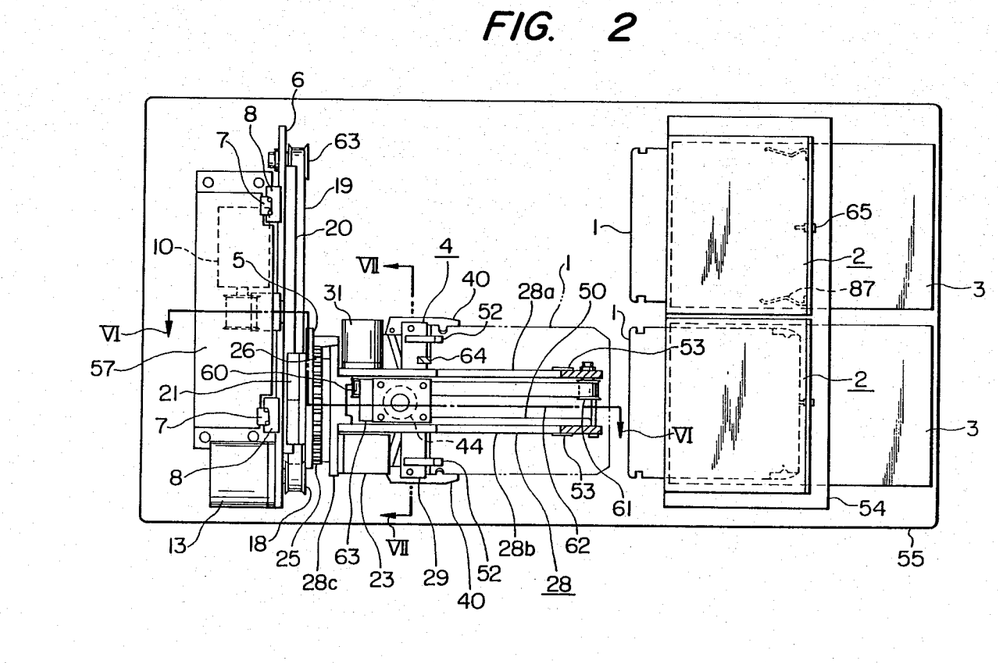
FIG. 2 is a plan view of the device in FIG. 1.
Figure 3:
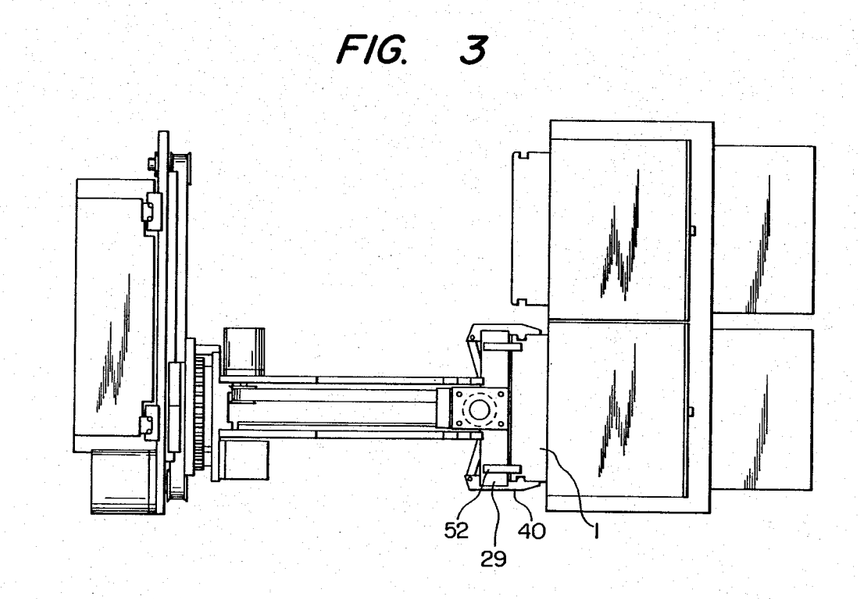
FIG. 3 is a plan view of the device in FIG. 1, showing an operation thereof.
Figure 4:
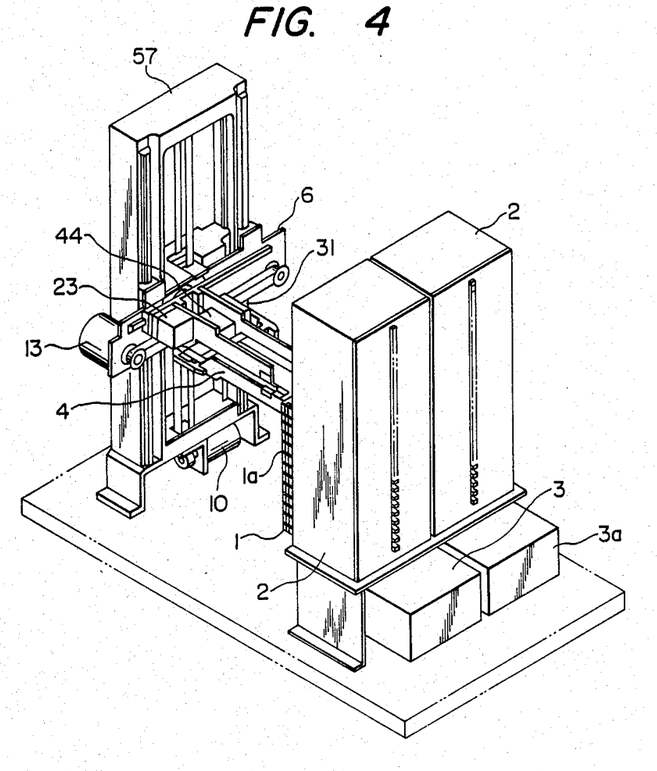
FIG. 4 is a perspective view of the device in FIG. 1.

FIG. 3 shows a state in which the movable body 29 and the clamp mechanism provided thereon are advanced from the state shown in FIG. 2 and the cartridge 1 in the stocker 2 is caught by the latter and FIG. 4 is a perspective view showing the present device as a whole.

Figure 5:
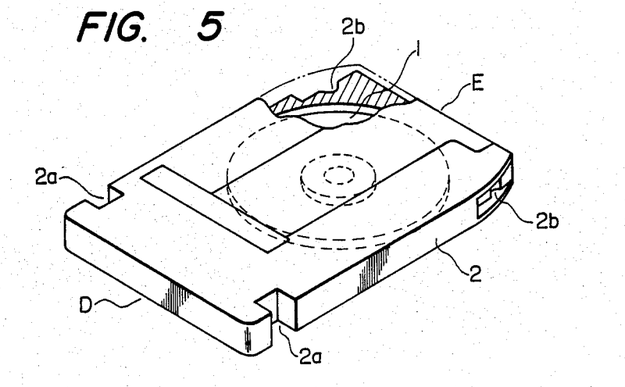
FIG. 5 is a perspective view of a cartridge to be handled by the device in FIG. 1.

FIG. 5 shows an outer configuration of the cartridge 1. The cartridge 1 is formed in both sides of a rear portion thereof with engaging recesses 2a and corner portions of a front portion thereof are loosely curved to facilitate an insertion thereof into the stocker 2 or the recording and reproducing device 3. In each of the curved rear portion of the cartridge 1, a semicircular notch 2b is formed. The cartridge 1 is pulled in the recording and reproducing device 3 by using the semicircular notches 2b. this configuration of the cartridge 1 is being standardized.

Figure 6:
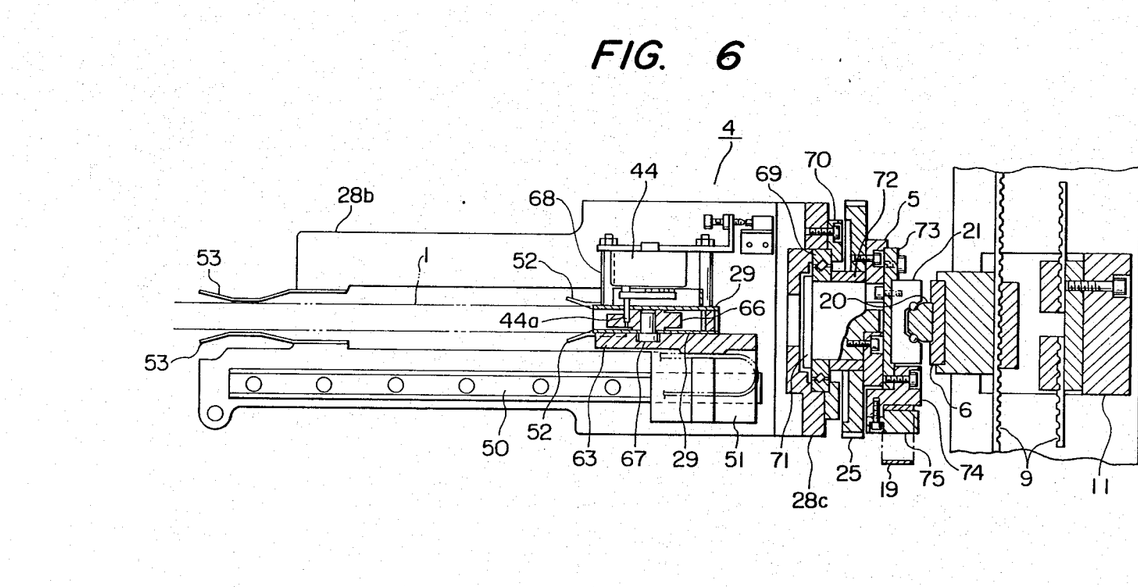
FIG. 6 is a cross section taken along a line VI—VI in FIG. 2.

In FIG. 6 which is a cross section taken along a line VI—VI in FIG. 2, a reference numeral 53 depicts a guide member in the form of leaf-spring mounted on each of the members 28a and 28b. Front end portions of the guide members 53 mounted on the ends of each member 28a, 28b are bent mutually outwardly to provide a smooth guide passage for guiding the cartridge 1. The leaf-springs 53 serve to absorb mechanical shock when the front portions of the cartridge 1 contact therewith during the cartridge 1 is pulled in the frame 28 through the opened ends of the leaf-springs 53. Other guide members are mounted on the moving body 29, which comprises a pair of parallel thin leaf-springs 52 having end portions bent mutually outwardly to provide a smooth guide passage, as is the case of the leaf-springs 53. The guide means 52 serves to prevent the cartridge 1 during pulling therein from tilting forwardly with the guide means 53 as a fulcrum during it is pulled therein and to pick-up the rear edge of the cartridge 1 when the cartridge 1 arranged on the shelves of the stocker 2 in stacked manner is clamped by the inserting and retrieving mechanism, so that , even if an alignment of the guide means 52 with the cartridge 1 is not exact, the inserting and retrieving mechanism can clamp the cartridge 1 and pull it out, easily.

A reference numeral 66 is a swing lever to be described later in detail. A link is connected to one side portion of the swing lever 66 and another link is connected to the other side portion thereof. The other ends of the links are connected to one ends of clampers 40, respectively, so that the latter can be opened and closed by a swing motion of the swing lever 66. The lever 66 is rotatably supported by a pin 67 which is supported by the support table 63 of the movable body 29. The swing lever 66 is driven by a swing motor 44 through a pin 44a implanted on a rotary disc mounted on a shaft of the motor. The swing motor 44 is mounted on the movable body 29 by support bolts 68 and designed to rotate by a constant angle when actuated, which, in this embodiment, is set to 33 degree. Upon a deenergization of the motor 44, the rotary disc is returned to an original position by a spiral spring provided within the motor.

The member 28c of the frame 28 is fixed to an outer race of the cross roller bearing 69 provided between it and a bearing holder 70. An inner race of the bearing 69 is fixed to the main shaft 71, relative rotation to the latter being prohibited by a collar 72. The main shaft 71 is fixed to the base member 5 which is in turn fixed to a plate 73 fixed to the slider 21. A belt receiver 74 is fixed to mounting plate 73. A portion of the belt 19 is clamped between the belt receiver 74 and a belt holding member 75 and the base member 5 having the inserting and retrieving mechanism 4 and the reversing shaft thereon is movable along the rail 20 mounted on the carriage 6.

Sliders 51 are formed on both sides of a lower surface of the support table 63 and the movable body 29 thereon and the clampers are movable along rails 50 formed in the sides of the members 28a and 28b and engaging with the sliders 51.

Figure 7:
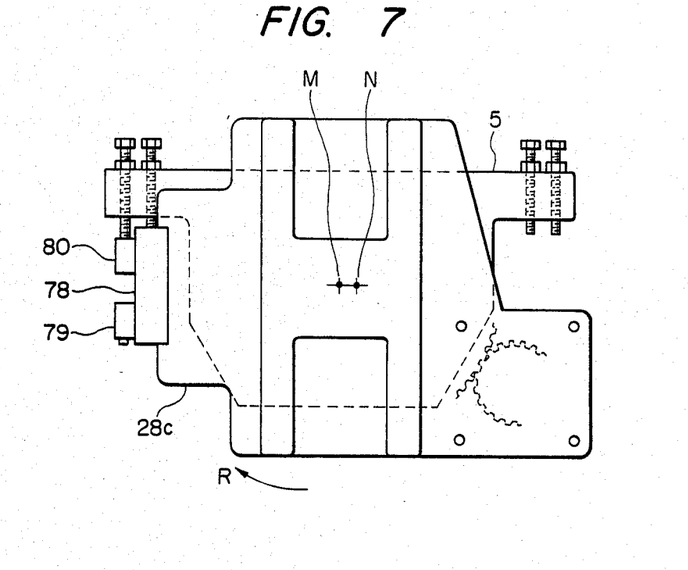
FIG. 7 is a cross section taken along a line VII—VII in FIG. 2.
Figure 8:
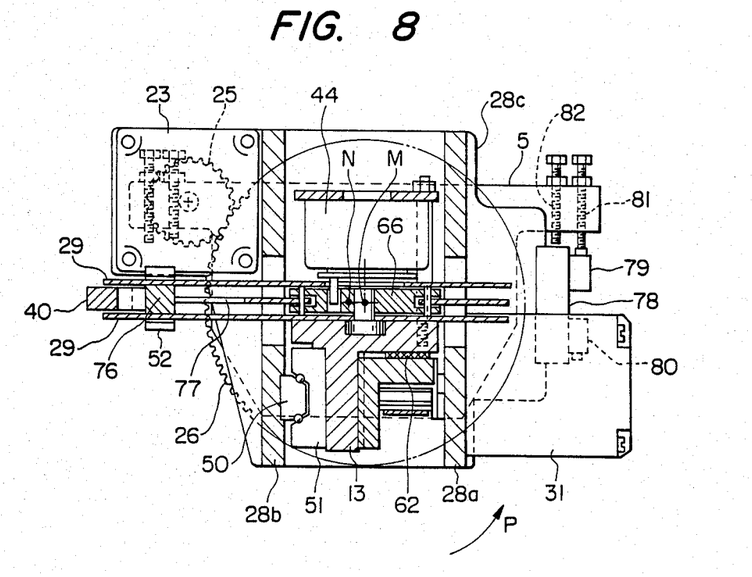
FIG. 8 is a similar view to FIG. 7, showing an operation of the device.

In FIG. 7 which is a cross section taken along a line VII—VII in FIG. 2 and shows the inserting and retrieving mechanism 4 being turned in a direction of an arrow P to a normal state by the gear 26 meshed with the pinion 25 rotated by the motor 23, a letter M depicts a rotation center of the movable body 29, i.e., a center of reversing movement thereof, and N a gravity center of the frame 28 to be reversed as a whole, which is shown in this figure deviated a little leftwardly from the rotation center M. FIG. 8 shows the inserting and retrieving mechanism 4 in a reversed state. In these figures, portions which are not rotated or reversed are only the base member 5 and the gear 26 fixed thereto. The rotation of the frame 28 is limited by a stopper 78 mounted on the holder 28c, the stop position being regulated by regulating screws 82 provided, respectively, on opposite end portions of the base member 5. Sensors 79 and 80 are provided on the stopper 78. The detection positions of the sensors 79 and 80 are regulated by regulating screws 81 provided similarly to the screws 82 such that they detect a normal position and a reversed position shown in FIGS. 8 and 7, respectively.

Due to the fact that gravity center N is on the left side of the rotation center M, the reversible assembly is always subjected to a moment acting in the direction of the arrow P, so that the stopper 78 is urged to the screw 82 stably, to thereby prevent an undesired rotation of the reversible assembly due to undesired external force from occuring.

In FIG. 8, the same assembly as that shown in FIG. 7 is rotated in a direction of an arrow R to the reversed state in which gravity center N becomes in the right side of the rotation center M.

Figure 9:
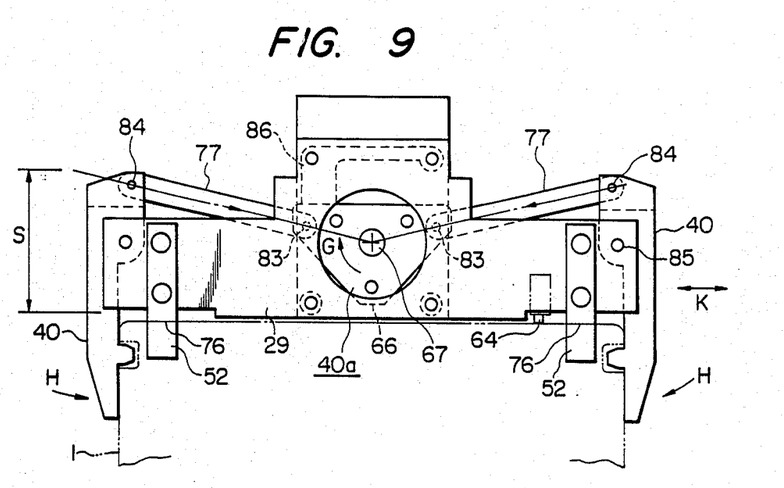
FIG. 9 is a plan view of a clamp mechanism.
Figure 10:
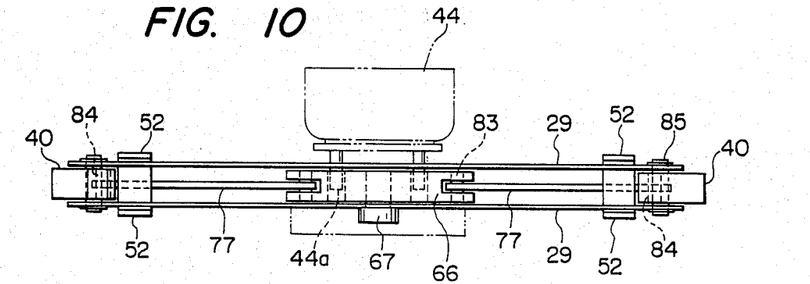
FIG. 10 is a front view of the clamp mechanism in FIG. 9.
Figure 11:
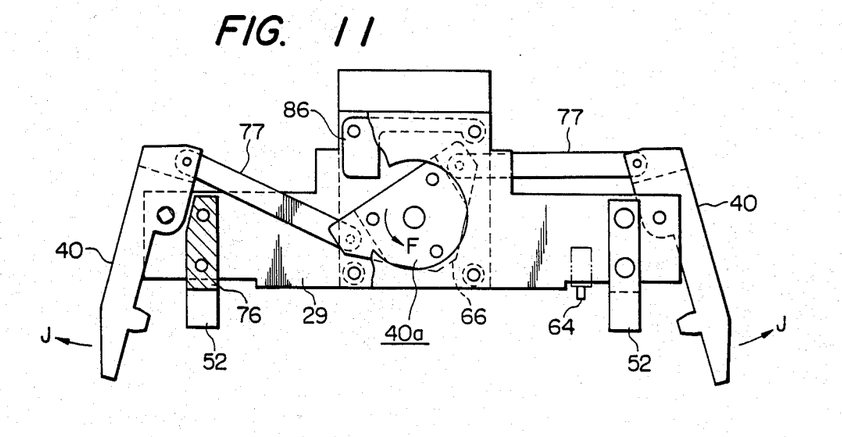
FIG. 11 is a similar view to FIG. 9, showing an operation thereof.

Describing the clamp mechanism 40a provided on the moving body 29 with reference to FIG. 9 showing it with the clampers 40 thereof being closed to clamp the cartridge 1 and FIG. 10 which is a front view of the clamp mechanism in FIG. 9 and FIG. 11 showing the clampers opened, the mechanism has a symmetrical structure about the swing lever 66 to balance moment of inertia of the mechanism and to make the latter compact by reducing the size of the frame 28. In FIG. 9, the pair of the clampers 40 are disposed between the thin plates constituting the moving body 29 and supported rotatably by pins 85, respectively. Opposite ends of the clampers 40 remote from the engaging portions thereof are rotatably connected to links 77 by pins 84, respectively. The links 77 are connected swingably to opposite end portions of the swing lever 66 by pins 83, respectively, in such a way that, when the lever 66 is rotated about the pin 67 in a direction shown by an arrow G by the spiral spring of the motor 44 and is made in contact with the stopper 86, a rotation center of the swing lever 66 and centers of the pins 83 and 84 on one side of the swing lever 66 are aligned on a straight line. As shown, this mechanism is the so-called toggle link structure for opening and closing the clampers 40 symmetrically simultaneously to each other. According to the toggle link structure, the clampers 40 are not opened to each other by inertia of the cartridge 1 clamped thereby even if the moving body 29 is driven in a direction shown by an arrow K at high speed by the lateral transportation means. That is, it is possible to hold the cartridge 1 stably by the guides 53 provided on the open end of the frame 28, the guides provided on the moving body 29 and the clampers 40.

In FIG. 11, the swing lever 66 is rotated in a direction shown by an arrow F by a certain constant amount to open the clampers 40 in directions shown by arrows J. In FIG. 11, a reference numeral 76 depicts pushing embers for pushing the rear edge of the cartridge 1 into the stocker 2 or the recording and reproducing device 3.

Figure 12:
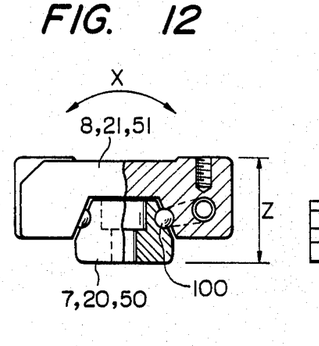
FIG. 12 is a partially cross sectioned, front view of a portion of a guide used for all moving shafts of the present invention.
Figure 13:
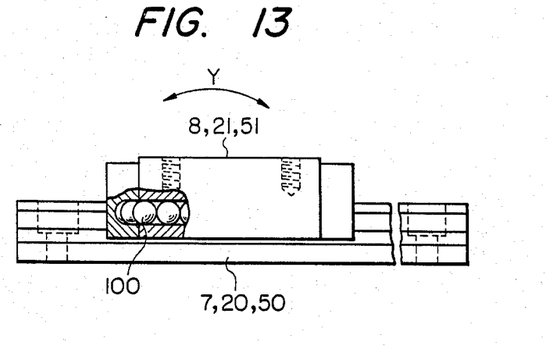
FIG. 13 is a side view o the guide in FIG. 11.

FIG. 12 shows a guide mechanism applicable to each of the vertical, lateral, forward and rearward movements of the inserting and retrieving mechanism and FIG. 13 is a side view of the guide mechanism in FIG. 12. In these figures, since the guide mechanism has a small height Z and, is rigid for loads in directions X and Y due to the fact that balls 100 are used for relative movement of the components thereof, it can be operated at high speed smoothly and exactly with minimum vibration by a small driving power.

The present device constructed as described hereinbefore serves to selectively derive any cartridge 1 in the stocker 2 and to insert the derived cartridge 1 into the recording and reproducing device 3 or vice versa. The present device also serves to hold the cartridge 1 without giving abnormal vibration or shocks thereto during vertical, lateral, rotational and axial transportations and to transport it at high speed in the respective directions so that a considerable amount of information can be readout in a short time, that is, to shorten access time to the cartridge 1.

An operation of the present device will be described with reference to a case where the cartridge 1a shown in FIG. 4 is to be derived from the stocker 2 and inserted into the recording and reproducing device 3, as an example. Upon an instruction ordering the same, the vertical motor 10 and the lateral motor 31 are driven by the controller (not shown) housed in the present device so that the inserting and retrieving mechanism 4 is moved until an operational center of the inserting and retrieving mechanism 4 coincides with a center of the rear face of the cartridge 1a. The positional coincidence between the centers of the inserting and retrieving mechanism 4 and the cartridge 1a is confirmed by a photoelectric sensor (not shown). The motors used may be step-motors and driven with a driving pattern suitable to move the inserting and retrieving mechanism 4 such that vibration of a top end portion thereof is minimum. Then, the swing motor 44 provided on the moving body 29 is actuated to open the clampers 40 and, simultaneously with the opening of the clampers 40, the motor 31 is actuated, so that the movable body 29 is moved forwardly to the cartridge in the stocker 2. When the guide means 52 provided in the front portion of the movable body 29 engages with an upper and a lower edges of the rear portion of the cartridge 1a and the sensor 64 detects the rear portion of the cartridge, the forward movement of the movable body is terminated and the motor 44 is deenergized upon which the clampers 40 are closed by the spiral spring in the swing motor 44 and engage with and hold the engaging portions formed in the both side portions of the cartridge 1a. This state is shown in FIG. 9. Then, when the closed state of the clampers 40 is detected by the sensor (not shown), the motor 31 is driven in the reverse direction to pull-in the cartridge 1a from the open end portion of the frame 28 to the closed end portion thereof through the guide means 53 provided on the open end portion of the frame 28 while the cartridge 1a is kept horizontal.

When the cartridge 1a is moved up to the position shown by a chain line in FIG. 2, the motors 10 and 63 are energized to move the inserting and retrieving mechanism 4 until the deriving center thereof becomes coincident with the center of the insertion slot of the recording and reproducing device 3. During this movement of the inserting and retrieving mechanism 4, a selection instruction is given to decide which side of the cartridge 1a is to be used and, if necessary, the motor 44 is actuated to turn the inserting and retrieving mechanism 4 by 180 degree.

Upon a completion of the operation mentioned above, the motor 31 is driven to advance the cartridge 1a to the recording and reproducing device 3. During this movement of the cartridge 1a, the latter is pushed by the pushing members 76 provided on the moving body 29, so that the engaging portions of the clampers 40 are moved away from the engaging portions of the cartridge 1a slightly to open the clampers 40 with small force to thereby make a power of the swing motor 44 necessary to open the clampers 40 small.

The forward movement of the cartridge 1a into the recording and reproducing device 3 is terminated by deenergizing the motor 31 upon an output signal from a sensor (not shown) provided in the device 3 indicating that the cartridge 1a has reached the desired position and, simultaneously therewith, the swing motor 44 is energized to open the clampers 40. When the clampers 40 are fully opened, the motor 31 is driven in the reverse direction to retrieve the clamp mechanism. Then, the swing motor 44 is deenergized to close the clampers 40 to thereby make them ready for a subsequent operation.

When a recording or reproducing operation of the recording and reproducing device 3 completes, an instruction for returning the cartridge 1a to the stocker 2 is given to the controller. An operation of the present device according to this instruction is performed in the reverse way to that mentioned above. In this operation, however, the sensor 65 provided on the rear portion of the stocker 2 detects the front end of the cartridge 1a inserted thereinto to terminate the energization of the motor 31. The cartridge 1a is held in place by holding springs 87 provided in the stocker 2 to prevent the cartridge from moving away from the shelf of the stocker 2 by abnormal vibration etc.

Figure 14:
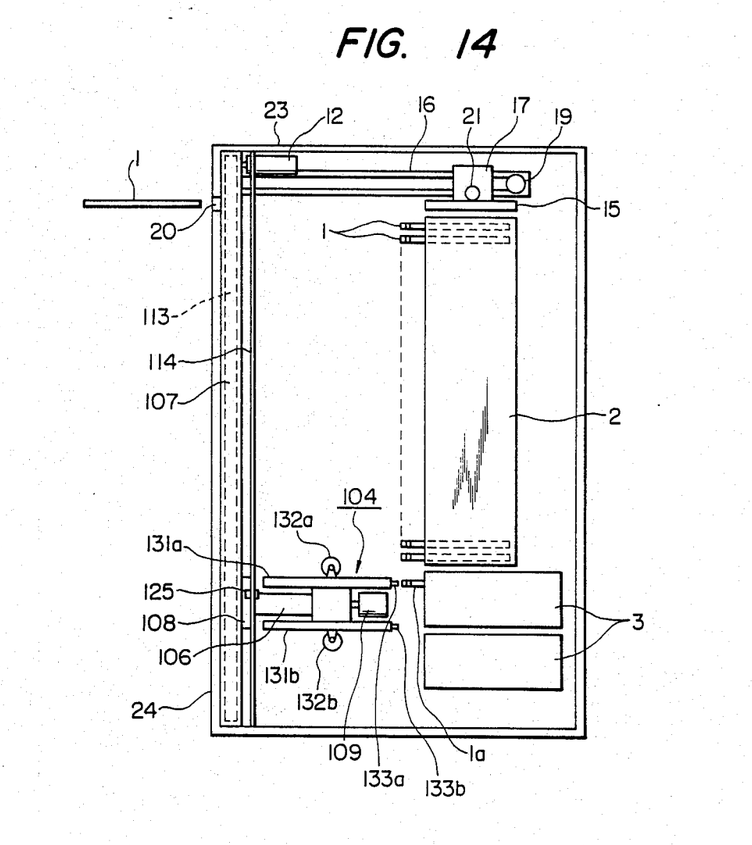
FIG. 14 is a side view of another embodiment of the present invention.
Figure 15:
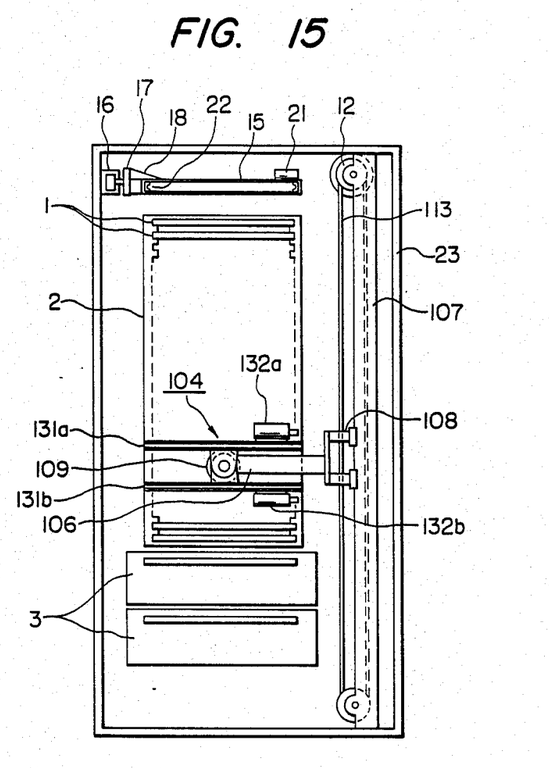
FIG. 15 ,is a front view of the device in FIG. 14.
Figure 16:
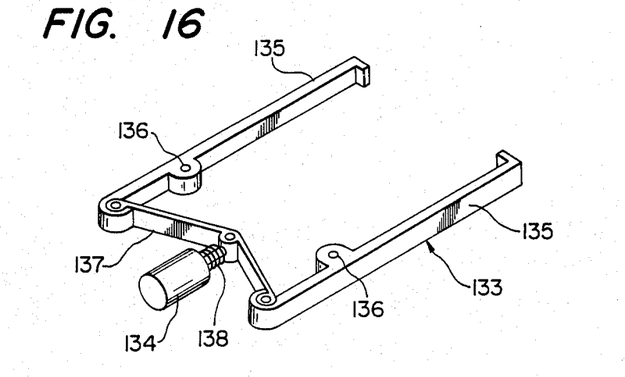
FIG. 16 is a perspective view of clampers of the device in FIG. 14.

FIGS. 14 and 15 show another embodiment of the present invention in side and front views, respectively. In these figures, a carrier 104 corresponding to the inserting and retrieving mechanism 4 in the preceding embodiment comprises an upper and lower carriers 131a and 131b having clampers 133a and 133b, respectively. The clampers 133a (or 133b) are shown in FIG. 16. The clampers 133 are supported operably by a main shaft 106 and vertically movably by vertical sliders 107 slidably supported by a vertical guide rail 108. The rotation of the clampers 133, i.e., the turning thereof, is performed by a motor 109. As shown in FIG. 16, the clampers 133 are pivotably supported by pins 36, respectively. Front ends 135 of the clampers 133 serve as hooks and the other ends are rotatably hinged with one ends of links 137 constituting a toggle link. The toggle link 137 are hinged with each other at the other ends thereof to which a plunger of a solenoid 134 is connected so that when the solenoid 134 is energized the clampers 133 are opened. When the solenoid 34 is deenergized, the plunger is retracted by a spring 138 to close the clampers.

When a cartridge 1 has been loaded in the recording and reproducing device 3 and is to be replaced with another cartridge, the carrier 131 is moved by means of the vertical motor 112 to a shelf in the stocker 2 in which the second cartridge is housed. The operation of the motor 112 is controlled by the scale 114 and the scale sensor 125 such that one of the carriers, for example, the upper carrier 131a is positioned exactly with respect to the shelf. Then, the solenoid 134 of the carrier 131a is energized to open the clampers 133a and simultaneously the motor 132a is actuated to advance the clampers 133a.

When the clampers 133a reach the engaging portion of the cartridge on that shelf, the solenoid 134 is deenergized to close the clampers 133a to thereby hold the cartridge. Then, the motor 132a is energized to retrieve the clampers 133a and receive it on the upper carrier 131a.

The carrier 131 is moved downwardly by the motor 112 to a position in which the lower carrier 131b having no cartridge is exactly faced to the recording and reproducing device 3.

After the cartridge in the recording and reproducing device 3 is ejected therefrom, the clampers 133b of the lower carrier 131b is opened by the solenoid 134 associated therewith while being advanced by the motor 132b and when it reaches the ejected cartridge closed by the solenoid 134 to hold the cartridge. Then the clampers 133b is retrieved by the motor 132b and thus the cartridge is received by the lower carrier 131b.

Then, the carrier 131 is moved so that the carrier 133a is positioned exactly with respect to the recording and reproducing device 3 and inserts the cartridge therein into the recording and reproducing device 3 by advancing the clampers 133a. The exchange of cartridge is completed in this manner.

Although, in this embodiment, the carriers 131a and 131b are not rotated around the support arm 106, it is possible to insert the cartridge on the upper carrier 131a into the recording and reproducing device 3 by rotating them around the main shaft 106 before or when the lower carrier 131b reaches the exact position with respect to the recording and reproducing device 3 such that the lower carrier 131b takes an upper position and the cartridge ejected from the device 3 is received by the second carrier and then rotating the carriers such that the first carrier takes the upper position to insert the cartridge into the recording and reproducing device.

When it is desired to turn the cartridge itself or to insert or retrieve a cartridge in the upper carrier into or from the lowermost recording and reproducing device, such turning mechanism as mentioned with respect to the first embodiment may be provided.

The solenoid 134 and the toggle link associated therewith for driving the clampers may be replaced by any suitable mechanism including a motor. Further, the optical scale sensor may be replaced by suitable means such as magnetic sensor.

According to the present invention, the cartridge is pushed into the recording and reproducing device by the pusher of the movable body and retrieved therefrom by the engagement of the engaging portions of the clampers with the engaging recesses of the cartridge. Therefore, it is possible to minimize driving power of the motor necessary to open the clampers while making the construction of the clamp mechanism simpler.

The symmetrical arrangement of the clampers around the swing lever in which the clampers is selectively opened by a swing motion of the swing lever makes the whole device compact and provides a reliable clamping operation even during transportation of the cartridge.

Further, the first sensor provided on the inserting and retrieving mechanism detects the rear end of the cartridge when it is derived from the stocker or the recording and reproducing device and the second sensor provided in the stocker or the recording and reproducing device detects the front end of the cartridge when it is inserted thereto. Therefore, the supporting structure becomes simple so that it is possible to reduce the manufacturing preciseness of the device in the moving direction of the cartridge with respect to the stocker or the recording and reproducing device.

According to the second embodiment of the present invention, the transportation mechanism can hold a pair of cartridges and the latters can be handled separately. Therefore, the number of vertical movements thereof necessary for replacement of cartridges can be reduced and the number of reciprocal movements of the clampers is also reduced, making the device adaptable for a high speed operation.

What is claimed for:

1. A disc memory including at least one stocker for storing a plurality of cartridges, each of said cartridges having engaging recesses on opposing sides thereof and having a rear surface thereon, at least one recording and reproducing device for recording information on a disc contained in said cartridge and/or reproducing the information, an inserting and retrieving mechanism having a rail for retrieving said cartridges from said stocker and inserting said cartridges into a recording and reproducing device or vice versa, a transportation mechanism for transporting said inserting and retrieving mechanism between said stocker and said recording and reproducing device and a reversing mechanism for reversing said inserting and retrieving mechanism, comprising: a movable body provided on said inserting and retrieving mechanism and being moveable along said rail, said movable body having a pushing member and a pair of clampers, said pushing member being adapted to push a rear surface of said cartridge into said stocker or said recording and reproducing device when said cartridge is inserted into said stocker or said recording and reproducing device, each of said clampers having one end adapted to engage with said engaging recesses of said cartridge and to pull out said cartridge from said stocker or said recording and reproducing device, wherein said clampers are supported pivotably by said movable body through fulcrum pins, respectively, and mutually connected pivotably by a toggle means, said toggle means being driven by a driving means to open and close said one end of each of said clampers, and wherein said driving means is swing lever rotatably supported by said movable body and said toggle means comprises a pair of connecting members having one end supported by said swing lever rotatably and symmetrically about a swing center of said swing lever, said pair of clampers being pivotably supported by said movable body, each of said clampers having said one end formed with engaging portions and another end connected rotatably to another end of said connecting member, respectively, such that said clampers can be rotated to open and close said one end of each of said clampers when said swing lever is rotated and such that, said when said one end of each of said clampers is closed, said connecting members are aligned such that a straight line extending therefrom, respectively, passes through said swing center of said swing lever.

2. The disc member device as claimed in claim 1, wherein each of said connecting members are regulatable in length.

3. A disc memory including at least one stocker for storing a plurality of cartridges, each of said cartridges having engaging recesses on opposing sides thereof and having a rear surface thereon, at least one recording and reproducing device for recording information on a disc contained in said cartridge and/or reproducing the information, an inserting and retrieving mechanism having a rail for retrieving said cartridges from said stocker and inserting said cartridges into a recording and reproducing device or vice versa, a transportation mechanism for transporting said inserting and retrieving mechanism between said stocker and said recording and reproducing device and a reversing mechanism for reversing said inserting and retrieving mechanism, comprising: a movable body provided on said inserting and retrieving mechanism and being moveable along said rail, said movable body having a pushing member and a pair of clampers, said pushing member being adapted to push a rear surface of said cartridge into said stocker or said recording and reproducing device when said cartridge is inserted into said stocker or said recording and reproducing device, each of said clampers having one end adapted to engage with said engaging recesses of said cartridge and to pull out said cartridge from said stocker or said recording and reproducing device, wherein said clampers are supported pivotably by said movable body through fulcrum pins, respectively, and mutually connected pivotably by a toggle means, said toggle means being driven by a driving means to open and close said one end of each of said clampers, and wherein said toggle means includes a pair of hinged connecting members having one end connected rotatably to another end of said clampers and said driving means comprises a solenoid means associated with a plunger and a return spring, an end of said plunger being engaged with said hinged portion of said toggle means such that, when said solenoid is actuated, said toggle means is toggled to open said clampers and, when said solenoid is deenergized, said plunger is returned by said return spring to close said clampers.

4. The disc memory device as claimed in any of claims 1, 3 or 2, further comprising a first position sensor provided on said inserting and retrieving mechanism for detecting a position of a rear end of said cartridge in which said clampers are ready to clamp said cartridge and a second position sensor provided in said stocker for detecting a position of a front end of said cartridge in which said cartridge is ready to be released from said clampers.

5. The disc memory device as claimed in any of claims 1, 3 or 2, further comprising a cartridge feeding and discharging mechanism for supplying said discharging said cartridges into and from said disc memory device and wherein said inserting and retrieving mechanism has a pair of cartridge holding portions so that a pair of cartridges can be retrieved, transported and inserted, simultaneously.

6. The disc memory device as claimed in claim 4, further comprising a cartridge feeding and discharging mechanism for supplying and discharging said cartridges into and from said disc memory device and wherein said inserting and retrieving mechanism has a pair of cartridge holding portions so that a pair of cartridges are to be retrieved, transported and inserted, simultaneously.

7. The disc memory device as claimed in any of claims 1, 3 or 2, wherein said inserting and retrieving mechanism includes a turn-over mechanism for turning said inserting and retrieving mechanism to select one side of said cartridge to be used and wherein said cartridge holding portions are arranged symmetrically about a rotation center of said turn-over mechanism.

8. The disc memory device as claimed in claim 4, wherein said inserting and retrieving mechanism includes a turn-over mechanism for turning said inserting and retrieving mechanism to select one side of said cartridge to be used and wherein said cartridge holding portions are arranged symmetrically about a rotation center of said turn-over mechanism.

9. The disc memory device as claimed in claim 5, wherein said inserting and retrieving mechanism includes a turn-over mechanism for turning said inserting and retrieving mechanism to select one side of said cartridge to be used and wherein said cartridge holding portions are arranged symmetrically about a rotation center of said turn-over mechanism.

* * * * *